(12) United States Patent
Klein

(10) Patent No.: US 8,889,258 B2
(45) Date of Patent: Nov. 18, 2014

(54) ADDITIVE FOR PRODUCING POSITIVE ACTIVE COMPOSITIONS FOR LEAD ACCUMULATORS

(75) Inventor: Ian Klein, Bad Harzburg (DE)

(73) Assignee: Penox GmbH, Koeln (DE)

( * ) Notice: Subject to any disclaimer, the term of this patent is extended or adjusted under 35 U.S.C. 154(b) by 0 days.

(21) Appl. No.: 13/699,289

(22) PCT Filed: May 19, 2011

(86) PCT No.: PCT/EP2011/058183
§ 371 (c)(1),
(2), (4) Date: Dec. 20, 2012

(87) PCT Pub. No.: WO2011/147740
PCT Pub. Date: Dec. 1, 2011

(65) Prior Publication Data
US 2013/0092053 A1    Apr. 18, 2013

(30) Foreign Application Priority Data
May 22, 2010 (DE) .......................... 10 2010 021 268

(51) Int. Cl.
B32B 5/16        (2006.01)
(52) U.S. Cl.
USPC .............. 428/402; 516/92; 429/227; 429/228
(58) Field of Classification Search
USPC ....................... 428/402; 516/92; 429/227, 228
See application file for complete search history.

(56) References Cited

U.S. PATENT DOCUMENTS

| 7,091,250 | B2 * | 8/2006 | Klein et al. | 516/88 |
| 7,435,758 | B2 * | 10/2008 | Klein et al. | 516/88 |
| 2004/0121233 | A1 | 6/2004 | Nitsche | |
| 2006/0093912 | A1 * | 5/2006 | Mayer | 429/227 |

FOREIGN PATENT DOCUMENTS

| DE | 10360027 | * | 7/2004 |
| DE | 10360027 A1 | | 7/2004 |

OTHER PUBLICATIONS

International Preliminary Report on Patentability of the European Patent Office in corresponding PCT Application No. PCT/EP2011/058183 dated Nov. 27, 2012.
International Search Report of the European Patent Office in corresponding PCT Application No. PCT/EP2011/058183.

* cited by examiner

Primary Examiner — Leszek Kiliman
(74) Attorney, Agent, or Firm — Kinney & Lange, P.A.

(57) ABSTRACT

An additive for producing positive active compositions for lead accumulators based on finely divided 4-basic lead sulphate having an average particle size of less than about 3 μm and also finely divided silica, where the additive additionally contains red lead ($2PbO.PbO_2$), is described. The finely divided silica prevents, in particular, agglomeration of the particles of the 4-basic lead sulphate, while the red lead leads to an optimized distribution of all constituents of the additive in the battery paste. The use of red lead also gives a cost advantage. Despite the replacement of part of the 4-basic lead sulphate by red lead, the properties achieved in the later use in battery operation are no worse. Thus, the batteries display, for example, improved charging behavior and a higher high-current discharging stability. The invention further relates to the use of the additive according to at least one of claims 1 to 15 for producing positive active pastes for lead accumulators, in particular for lead accumulators having a high total discharging stability.

18 Claims, 3 Drawing Sheets

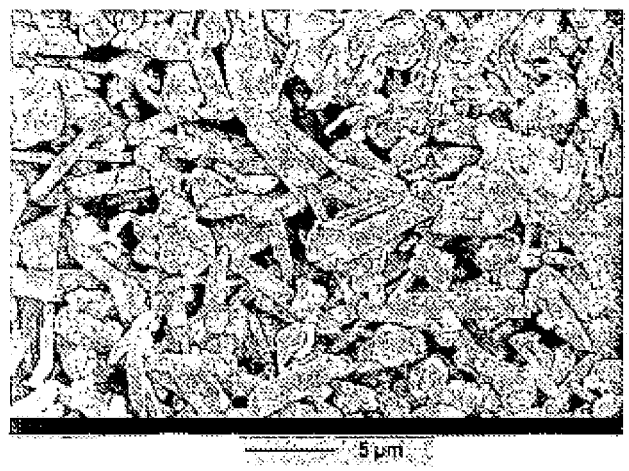
Fig. 1 (only TBLS+, magnification 2000:1)
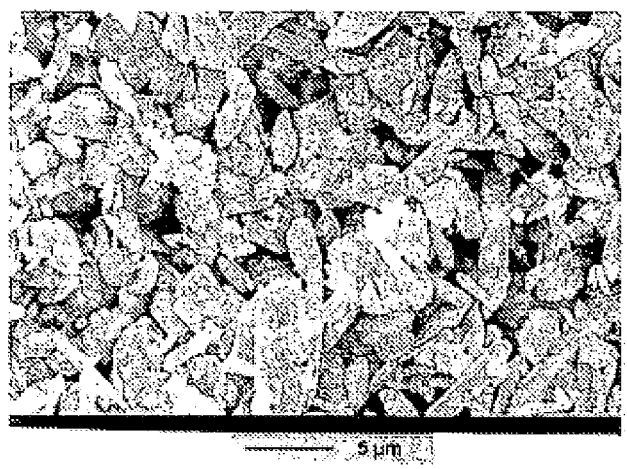
Fig. 2 (TBLS+/red lead mixture, magnification 2000:1)

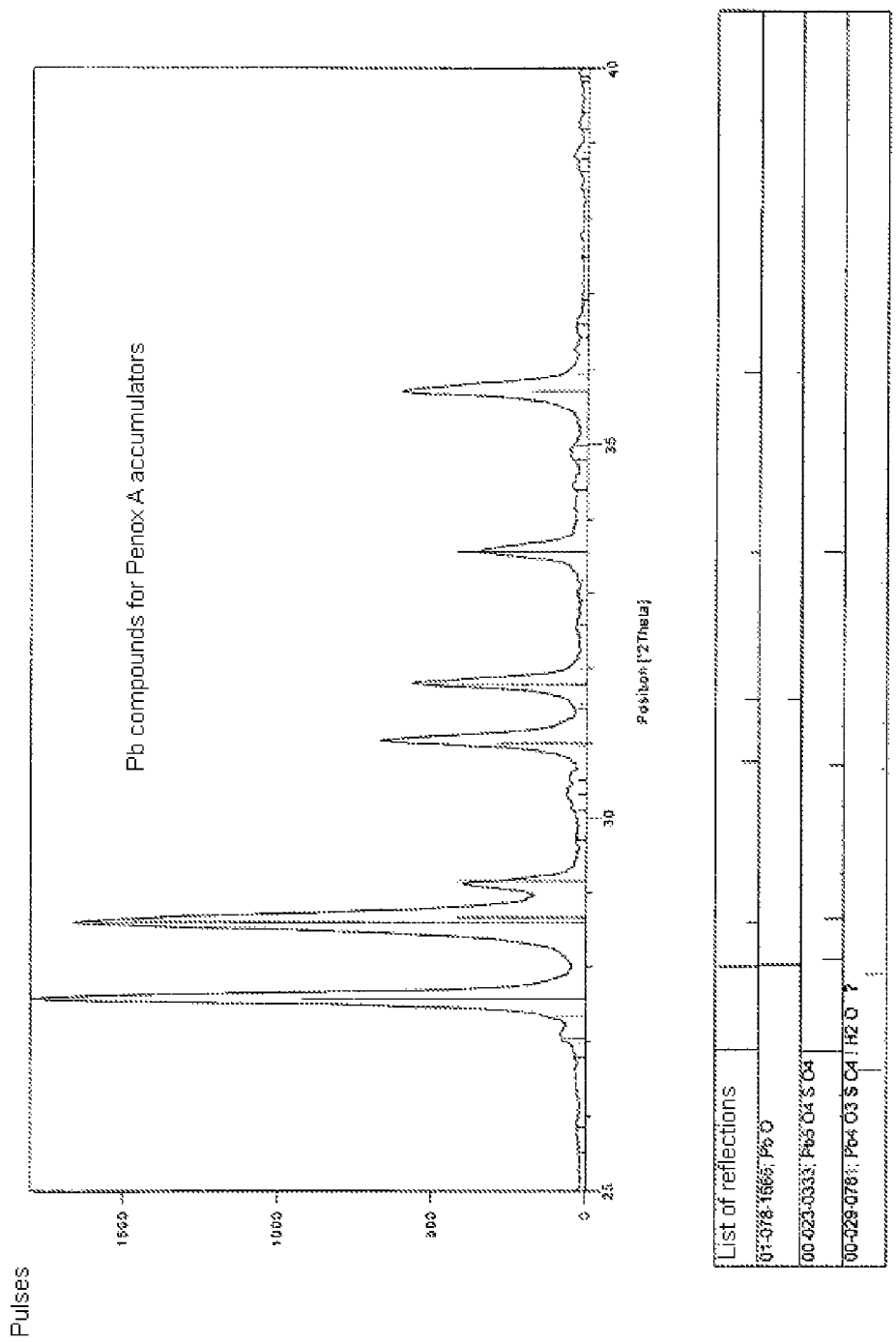
Fig. 3 X-ray diffractogram of the battery composition with TBLS+

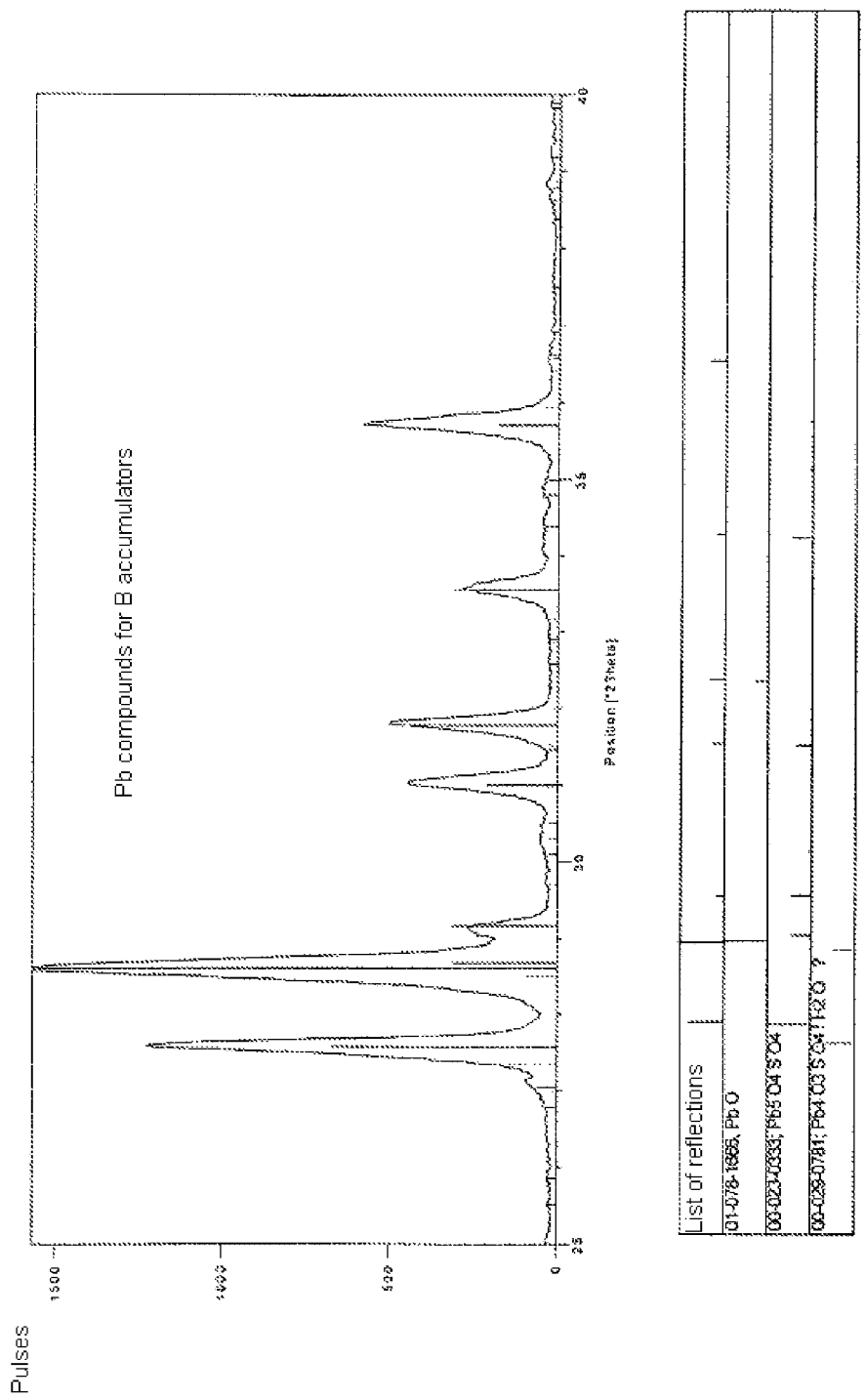
Fig. 4 X-ray diffractogram of the battery composition with TBLS+/red lead mixture

ADDITIVE FOR PRODUCING POSITIVE ACTIVE COMPOSITIONS FOR LEAD ACCUMULATORS

BACKGROUND

The invention relates to an additive for production of positive active compositions for lead accumulators based on finely divided tetrabasic lead sulphate having a mean particle size of less than about 3 μm and finely divided silica, and to a process for producing this additive.

According to the prior art, the positive plates, in the course of production of lead accumulators, after the grid has been pasted with the positive active composition, are ripened and dried in batches or continuously in what are called ripening and drying chambers. The ripening forms tribasic ($3PbOPbSO_4$) and/or tetrabasic ($4PbOPbSO_4$) lead sulphates from the main ingredients in the form of lead oxide, water and lead sulphate. The plates are predominantly placed in stacks on pallets without dispersing them. Less commonly, they are placed on pallets without dispersing them or, in the specific case of double grids with lugs on the outside, hung loosely in frames.

For the ripening to give tribasic lead sulphate having crystal sizes of <10 μm, it is common practice to ripen the plates at about 55° C. over a period of 12 to 24 hours and then to dry them. According to the oxide used and the residual moisture content desired, the drying takes up to a few days.

Depending on the chemical and physical conditions, a phase transition from the formation of tribasic lead sulphate to the formation of tetrabasic lead sulphate takes place within the temperature range from 60 to 70° C. For the ripening to give tetrabasic lead sulphate, the plates, according to standard practice, are ripened at a temperature of typically >80° C. in water vapour for a few hours and then dried as in the case of tribasically ripened plates. A significant disadvantage in the case of such a ripening operation under water vapour is the formation of coarse tetrabasic lead sulphate crystals, with possible occurrence of crystal sizes >50 μm.

The ripened active composition of the positive plates is converted electrochemically to lead dioxide during the subsequent formation. The conversion of the basic lead sulphates becomes more demanding and laborious with increasing crystal size. The amount of electrical energy required for conversion of a coarsely crystalline structure is more than 25% higher than that for a structure comprising small crystals. A "structure comprising small crystals" here shall be understood to mean a material in which the crystal size is <10 μm. In the case of a structure comprising large crystals, crystals >30 μm are present. For complete formation, rest periods additionally have to be included. As a result of the introduction of the higher amount of energy and the necessity of including rest periods, the formation of coarsely crystalline tetrabasic lead sulphate generally takes much longer.

Ripening to give tetrabasic lead sulphates is advantageous in the case of lead accumulators with antimony-free alloys for the positive grids. Lead accumulators with antimony-free alloys for the positive grids and tetrabasically ripened, positive active compositions have a stable capacity under cycling and have a distinctly prolonged lifetime. Lead accumulators with antimony-containing alloys in the positive grids are additionally being replaced by antimony-free grids since these lead accumulators additionally have longer storability and visibly lower water consumption.

For this reason, there is a great interest in processes and means of ripening positive plates to give small crystals of tetrabasic lead sulphate. According to the prior art, two processes for this purpose should be emphasized:

According to a customary manufacturing practice, the plates are first tribasically ripened and advantageously dried below residual moisture content 0.5% by weight. This is followed by a water vapour treatment at temperatures of typically >80° C. for several hours. During this phase, the tribasic lead sulphate is converted to tetrabasic lead sulphate. The crystal size here remains virtually unchanged, provided that the moisture content during the water vapour treatment of the plates does not exceed about 2% by weight. In the case of excessively moist plates, growth to form coarse crystals of tetrabasic lead sulphate occurs. In the case of a properly executed process, after another subsequent drying operation, plates comprising small crystals of tetrabasic lead sulphate are present. A great disadvantage of this process lies in the long processing time. In addition, the paste-grid binding is poorer than in the case of the positive plates ripened directly to give coarse crystals of tetrabasic lead sulphate in water vapour. The size of the crystals of the tetrabasic lead sulphate cannot be controlled and is at crystal sizes of <3 μm. In the case of cyclic deep discharge of wet lead accumulators, this can lead to irreparable damage to the positive electrodes and hence to shortening of the service life of the lead accumulators.

In a second known process, tetrabasic lead sulphate which has previously been ground to a small size is added to the active positive composition during the production process. The ripening is effected in the same way as in the ripening discussed to give coarse crystals of tetrabasic lead sulphate under water vapour and preferably at temperatures above 80° C. The tetrabasic lead sulphate crystals added, which have been ground to a small size of diameter <1 μm act as nucleators and allow individualized plates to have controlled crystal growth to give a tetrabasic crystal structure comprising small crystals. This process is preferably performed continuously.

The disadvantage of this process is the need to disperse the plates, for example by suspending double plates at a distance or by means of a breathable barrier membrane between individual plates. It is now common practice in the production of plates of lead accumulators to stack these in stacks without spacers after pasting and to ripen them in the stack. The necessity of individualizing the plates thus constitutes considerable additional work. Thus, the current systems and techniques for plate production cannot be used without new additional equipment or considerable alterations. The dispersal of the plates by means of intermediate spaces or breathable barrier membranes leads to more space being required, as a result of which the capacity for plates in existing ripening and drying chambers is considerably reduced.

A further development of the above prior art is disclosed by WO 2004/059772 A2. This relates to an additive for production of positive active compositions for lead accumulators based on tetrabasic lead sulphate. This additive contains a tetrabasic lead sulphate having a mean particle size of less than about 3 μm and, for prevention of the agglomeration of the particles of the tetrabasic lead sulphate, finely divided silica. The finely divided silica is in hydrophobic and/or hydrophilic form and is especially fumed. This known additive exhibits extensive advantages, as shown in WO 2004/059772 A2. For instance, in the case of use of this additive, the entire spectrum of current plant technology and customary process operations is covered. Current pasting lines with downstream stacking systems for all standard ripening and drying chambers are usable without modification. In addition, this additive can be used to provide a continuous ripening and drying technique within an overall period of about 3 to 4 hours. In all applications addressed, the end product which occurs is small crystals of tetrabasic lead sulphates having crystal sizes of less than 10 µm. The plates obtained thereby are just as easy to form as those manufactured from tribasic lead sulphates.

BRIEF DESCRIPTION OF THE DRAWINGS

FIG. 1 shows an image for the ripened battery paste which derives from TBLS+.

FIG. 2 shows an image of the ripened battery paste which derives from a TBLS+/red lead mixture, according to an embodiment of the invention.

FIG. 3 illustrates an X-ray diffractogram of a battery paste composition with TBLS+.

FIG. 4 illustrates an X-ray diffractogram of a battery paste composition with a TBLS+/red lead mixture according to an embodiment of the invention.

DETAILED DESCRIPTION

It is an aim of the invention to maintain the advantages associated with the teaching of the prior art according to WO 2004/059772 A2 by a further development, but it is an especial aim to optimally distribute the constituents of the additive in the battery paste. In addition, it is an aim of the invention to enable inexpensive production of advantageous tetrabasically ripened, cycling-resistant batteries. Moreover, the ripened plates of the batteries are to enable better chargeability. As a result, lower currents are required for forming of a battery. In other words, less energy has to be expended in order to make the battery work. In addition, the particle size, especially in the case of industrial batteries, is desirably to be controllable, such that, for example, tetrabasic lead sulphates for the batteries can be obtained with a crystal size of about 15 to 18 µm. This is also intended to solve a problem in the prior art, that about 2-4 kg are used per 1 metric tonne of lead paste with the existing additive. In this context, it is troublesome to achieve an appropriate and desirably good distribution. The additive which is the aim of the invention is especially intended to bring about optimized distribution of the other constituents of the additive in the battery paste.

This aim is addressed by an additive for production of positive active compositions for lead accumulators based on finely divided tetrabasic lead sulphate having a mean particle size of less than about 3 µm and finely divided silica, which is characterized in that the additive comprises red lead ($2PbO \cdot PbO_2$).

An optimal solution to the stated aim is addressed by virtue of the additive containing about 20 to 80% by weight, especially about 40 to 70% by weight, of red lead. It is especially preferable when the additive contains about 45 to 65% by weight of red lead, especial preference being given to the range from about 55 to 65% by weight. The mean particle size of the red lead is not of critical importance, but it is appropriately less than about 1.5 µm, the range from about 0.2 to 1 µm being especially advantageous. It is especially favorable when the mean particle size of the red lead is between about 0.4 and 0.6 µm. In advantageous embodiments of the invention, optimization of the specific BET surface area of the red lead is desirable. This is possible for a person skilled in the art.

When "red lead" is discussed in the context of the invention, it should be considered that the red lead contains $PbO_2$ as well as PbO. In the context of the invention, it is preferable that there are less than 2.2 mol of PbO per 1 mol of $PbO_2$ in the red lead used. It is very especially preferable when there are less than 2.1 and especially about 2 mol of PbO per about 1 mol of $PbO_2$. It has been found that the mixing of pure $PbO_2$ with pure PbO leads to disadvantages. Free PbO would undesirably form lead hydroxides. The PbO is chemically incorporated in the red lead and does not lead to these disadvantages. Commercial red lead may contain about 80% $Pb_3O_4$ ($2PbO+PbO_2$) and additionally free PbO to a certain extent. It is therefore desirable to employ commercially available red lead in which the free PbO is negligible, especially if at all possible less than 20% by weight, especially less than 15% by weight, of PbO. It is especially advantageous when if at all possible <10% free PbO is present.

For optimization of the inventive additive, it is appropriate that the red lead has a specific BET surface area of less than about 1.5 $m^2/g$, especially of less than about 1.3 $m^2/g$, it being preferable when the corresponding BET values are between about 1.3 and 0.9 and especially between about 1.3 and 0.5 $m^2/g$.

The further constituents of the inventive additive, especially in their optimal configurations, are to be described hereinafter:

It has been found in the case of use of the inventive additive that especially good effects are achievable when the mean particle size of the tetrabasic lead sulphate is especially less than about 1.5 µm. The range from about 0.2 to 0.9 µm is found to be especially advantageous. A value below 0.2 µm would not bring any economic advantage. With increasing mean particle size, the amount of additive has to be increased, and so exceedance of the upper value should be avoided here too for economic reasons.

It has been found that the commercially available finely divided silicas are especially advantageous when the specific BET surface area thereof is less than 300 $m^2/g$, especially less than 150 $m^2/g$. The commercially available finely divided silicas are typically classified in the type designation by the specification of the specific surface area. Especially, a correlation can be made between the figures for the specific surface area of the finely divided silica and the corresponding particle sizes in the alkaline range which is present in the production of the active compositions.

An excessively fine particle size of the silica should preferably be avoided. The mean particle size of the finely divided silicas used, given such a consideration, is appropriately in the range between about 10 and 120 nm, especially between about 20 and 80 nm, the range from about 40 to 60 nm being especially advantageous. If the value is below about 10 nm, the desired effect is not established with respect to the avoidance of agglomeration of the particles of the tetrabasic lead sulphate. The value of 120 nm could in principle also be exceeded in individual cases, although the desirable effects are best manifested within the discussed range from about 40 to 60 nm.

When the particles are too small, the effect of this is that, during the ripening, a broad grain distribution of tetrabasic lead sulphate crystals of different crystal size occurs. In the case of utilization of such silicas, tetrabasic lead sulphate crystals having a particle size of more than 10 µm cannot be avoided. These occur partly in individual distribution, partly in clusters, and can reach crystal sizes as typically encountered in the case of ripened plates comprising excessively coarse crystals. Within the particle size range discussed from especially about 20 to 80 nm and very especially from about 40 to 60 nm, the agglomeration of the finely ground tetrabasic seed crystals is prevented. In addition, it is ensured that very homogeneous fine crystals of tetrabasic lead sulphate crystal structures are formed in the course of ripening. The final size of the tetrabasic lead sulphate crystals is controlled by the amount of micro sulphate added. For economic reasons, it has been found to be advantageous for lead accumulators with free sulphuric acid as an electrolyte to fix the amount such that a tetrabasic crystal structure comprising small crystals with crystal sizes within a range from about 5 to 10 µm is achieved. For such a distribution, a simple formation is possible. In the case of closed lead accumulators with fixed electrolyte in gels or microporous glass nonwoven, a shift to smaller crystal sizes with an increase in the amount of micro sulphate may be advantageous. As guide values, in the case of addition of about 0.5 to 3.0% by weight of the inventive slurry, the crystal sizes of the tetrabasic lead sulphate, after the ripening of the active composition may be controlled within the range from about 2 to 10 µm. For economic reasons, it is suggested that the amount of slurry be fixed such that, for (a) what are called wet lead accumulators, crystal sizes of about 5 to 10 µm are obtained by addition of about 0.5 to 2% slurry and, for (b) closed batteries, of about 2 to 5 µm by addition of about 2 to 3% by weight. Accordingly, the desirable effect is controlled by the amount of added micro sulphate and not by process parameters according to the customary procedure (temperature, moisture content and time).

In the context of the invention, the person skilled in the art, with regard to the selection of the finely divided silica, is not subject to any significant restriction. Preference is given, however, to using fumed silicas, specifically "hydrophobic" and/or "hydrophilic" qualities.

With regard to the ratio of tetrabasic lead sulphate and finely divided silica in the inventive additive, there is no critical restriction. It will be appreciated that the proportion of finely divided silica must be selected at such a level that the desirable effect of the prevention of agglomeration of the particles of the tetrabasic lead sulphate takes place to the desired extent. Appropriately, the composition of the inventive additive is adjusted such that, based on the total weight of tetrabasic lead sulphate and finely divided silica, about 0.01 to 10% by weight, especially about 0.02 to 5% by weight, of finely divided silica is present. Very especially, the range from about 0.05 to 0.5% by weight is selected. Below the value of 0.01% by weight of finely divided silica, agglomeration is no longer sufficiently prevented. At a value of more than 10% by weight, no further significant enhancement of this desired effect takes place.

The quantifying relation between the finely divided tetrabasic lead sulphate and the red lead likewise included in the inventive additive is not critical. According to the application, this relation can be optimized by a person skilled in the art. It could be specified as advantageous if there are about 1.0 to 2.0 parts by weight of red lead, especially about 1.4 to 1.6 parts by weight of red lead, per 1 part by weight of finely divided tetrabasic lead sulphate. In any case, the proportion of tetrabasic lead sulphate, with respect to the prior art as outlined above, is appropriately reduced or replaced by the red lead (inexpensive) only to such an extent that the desirable effects still occur and the object of the invention is achieved to the desired extent.

The inventive additive is preferably in the form of an aqueous slurry and is especially obtained by the process according to the invention which will be described later. This aqueous slurry is preferred in possible uses addressed later. It is nevertheless possible to dry the aqueous slurries obtained to give a powder, this preferably being obtained by spray-drying the aqueous slurry. It has been found to be advantageous that the aqueous slurry discussed, which is sent to the intended use without drying, has a solids content of about 10 to 70% by weight, especially of about 20 to 50% by weight. If the maximum value of 70% by weight is exceeded, homogeneous incorporation into the positive active composition is made more difficult or impossible. The uniformity or homogeneity of the finished positive active composition is required to achieve a homogeneous particle size distribution with a narrow range through the ripening. Theoretically, the lower restriction in the solids content of the inventive aqueous slurry is limited only by paste formulation with respect to the water content.

The invention further provides a process for producing the inventive additive as described above. This process is characterized in that tetrabasic lead sulphate and red lead are wet-ground in an aqueous medium, especially in demineralized water, the grinding being continued until the mean particle size of the tetrabasic lead sulphate is less than 3 µm, and finely divided silica, especially in hydrophilic and/or hydrophobic form, being added to the material which is to be ground or has been ground.

The wet grinding performed in the context of the invention is preferably effected in stirred ball mills, especially in closed stirred ball mills. The closed stirred ball mills exhibit the advantage that the grinding energy is introduced in an optimized manner. It has been found in the case of wet grinding that the grinding bodies appropriately take the form of zirconia balls. These preferably have a diameter of 0.2 to 0.6 mm, especially about 0.3 to 0.5 mm. Very especial preference is given to a diameter of about 0.4 mm. In order to optimally achieve the successes which are the aim of the invention, the wet grinding is preferably effected at a temperature of less than about 70° C., especially of less than 60° C. The range from about 40 to 50° C. leads to especially good technical results.

The invention is accordingly embodied especially in a slurry containing the inventive additive. As shown below, this slurry can be converted to a dry inventive additive. In general, the inventive slurry, however, is sent directly as such to the relevant end use thereof, especially, in the context of the use of the additive, for production of positive active pastes for lead accumulators, especially for lead accumulators with high deep discharge resistance. This will be discussed in detail hereinafter. The amount of the inventive additive obtained in the aqueous slurry is not subject to any critical restrictions. It is preferable when it is present in the aqueous slurry in an amount of 30 to 65% by weight, especially 50 to 60% by weight. An amount of 53 to 57% by weight may be specified as an especially preferred range. Especially favorable results are achieved when the percentage by weight of the additive in the aqueous slurry is 55% by weight.

It is possible and appropriate in individual cases to convert the grinding product obtained in the form of an aqueous slurry in the course of wet grinding to a powder by drying, especially by spray drying.

The process according to the invention and the advantageous uses of the inventive additive are to be explained in detail hereinafter, also with regard to achievable advantages:

According to the invention, grinding of tetrabasic lead sulphate in an aqueous medium with addition of specific finely divided silica and red lead produces a slurry, referred to hereinafter as "micro sulphate". A commercial tetrabasic lead sulphate or a tetrabasic lead sulphate obtained from tetrabasically ripened plates is ground as the starting substance in a wet grinding process, for example with stirred ball mills, especially in the closed form, preferably to a mean crystal size of less than 1 µm. The essential point here is that the additional parameters addressed with regard to the "silica" and the "red lead" are complied with. For instance, especially, the silica must be finely divided, which is not equally true of the red lead. While it is preferable that the finely divided silica has a mean particle size of about 10 to 120 nm, the mean particle size of the red lead is preferably less than about 1.5 μm and especially between about 0.2 and 1 μm.

The silica is preferably of hydrophobic character. Preference is given here to the fumed silica discussed. The fumed silica exhibits the especial advantage that it has a desirable purity, such that no extraneous substances disrupt the operation of the lead accumulator. It is advantageous to add the finely divided silica at an early stage to the tetrabasic lead sulphate to be ground. However, another possibility is subsequent metered addition in a suitable metering system. This leads to additional economic expenditure and prolonging of the overall process time.

It is industrially advantageous to use slurries obtained in the wet grinding process as an addition to the mixing process of the active positive compositions in the course of production of the lead accumulators. For instance, the slurry can be added easily by means of a simple metering device to the mixing process.

Drying and production of a powder from the slurry is possible and advisable in specific applications, especially in the context of spray drying. As a result of the additional complexity and the observation of the occupational hygiene regulations, the production of a powder is generally not advisable with respect to the use of an aqueous slurry, in view of possible dust nuisance.

The inventive concept as described above is also in good accordance with the further teaching of the invention, that the finely divided silica, especially in hydrophobic and/or hydrophilic form, especially in fumed form, is used in conjunction with finely divided tetrabasic lead sulphate having a mean particle size of less than about 3 μm and with the red lead, especially having a particle size of about 0.2 to 1 μm and these three components are added to a positive active composition for lead accumulators. These three components are preferably added successively to the positive active composition for lead accumulators, particular preference being given to adding first the finely divided tetrabasic lead sulphate and then the finely divided silica and the red lead to the positive composition.

After addition of the slurry obtained in accordance with the invention to the positive active composition during the mixing operation, the subsequent ripening in the embodiments specified hereinafter gives rise to tetrabasic lead sulphate comprising especially small crystals. This results in the advantage that the existing systems can be utilized advantageously without alterations in the case of use of the inventive additive. It is preferable that the above-described additive is used in the positive active composition for the ripening and drying of individualized and non-individualized plates in the production of lead accumulators. Especially advantageously, the ripening of the plates is effected in stacks, horizontally, vertically or suspended, under the action of steam at a temperature of about more than 60° C., especially at a temperature of about 80 to 95° C., within about 1 to 2 hours. Good results are also achieved when the ripening of the plates is performed in stacks, horizontally, vertically or suspended, in batch chambers or under the action of steam at temperatures below about 70° C. and within 12 to 24 hours.

The plates can also be ripened in a continuous ripening and drying operation. Especially good results are achieved when the ripening of the plates is performed in stacks, horizontally, vertically or suspended, in a continuous ripening and drying operation under the action of steam at about 80 to 95° C. within about 1 hour. In the continuous ripening and drying operation described, it is especially preferable that the ripening and drying is effected in a multistage drying at rising temperatures. It has been found to be especially advantageous that the drying at rising temperatures commences at about 50° C. and is performed rising to about 90° C., over about 1 to 4 hours, especially over about 2 to 3 hours.

The good distributability of the tetrabasic seed crystals in the positive active composition by virtue of the finely divided silica and the red lead leads, in the ripening, to a tetrabasic crystal structure which is characterized by an especially narrow range of crystal sizes and is of very homogeneous composition. This applies to plates in a stack, and also to dispersed plates in the ripening. By virtue of the narrow range of tetrabasic crystal sizes, a higher surface area is achieved for the same pore volume, or in other words a higher pore volume is achieved for the same surface area of the tetrabasic crystals. The advantage lies in an increase in the amount of sulphuric acid absorbed in the free pores of the plate. This improves the electrical performance data. For the user of micro sulphate, an economic advantage is the possibility of saving active positive composition for the same performance data of the lead accumulators.

In the case of application of the inventive teaching, the entire spectrum of current plant technology and customary process operations is covered. Current pasting lines with the downstream stack systems and also all standard ripening and drying chambers are usable without modification. In addition, a continuous ripening and drying technique over a total period of about 3 to 4 hours can be provided in the future. In all applications addressed, the end product which occurs is small crystals of tetrabasic lead sulphates having crystal sizes of less than 20 μm. The plates thus produced are just as easy to form as those manufactured from tribasic lead sulphates.

The advantages of the inventive additive are especially that the ripened lead plates enable better chargeability. At the same time, lower currents are required for formation of a battery. In other words, less energy has to be expended in order to make the battery work. In addition, the particle size, especially in the case of industrial batteries, can be optimally controlled. It is desirable in especial cases to establish tetrabasic lead sulphate having a particle size of about 15 to 18 μm in the batteries. Such control can be brought about especially advantageously with the inventive additives. The problem is generally that there are about 2-4 kg per 1 t of lead paste with the existing additives. It is troublesome here to achieve an appropriately good distribution. With the inventive additive, it is possible to use a higher amount of 10 kg/t of lead paste, and the inclusion of the red lead surprisingly, as already emphasized, brings about optimized distribution of all constituents of the additive, including the red lead itself, in the battery paste. Furthermore, the additional inclusion of red lead does not have any significant influence on the cost of the product. Given comparable effects, the result is that the costs can be lowered by about one third.

The invention is to be illustrated in more detail hereinafter by examples and comparative examples.

EXAMPLES

Comparative Examples

Two aqueous slurries are produced according to the formulations which follow in Table 1. The specific procedure was as follows: in one mixture, the TBLS+ which follows the definition according to claim 1 of EP 1 576 679 B1 (corresponding to WO 2004/059772 A2) was employed. In the other formulation, the proportion of TBLS+ in the slurry was reduced and replaced by red lead.

Preparation of the Inventive Slurry:
- 40 parts by weight of tetrabasic lead sulphate
- 60 parts by weight of red lead (>86% $Pb_3O_4$)
- 0.3 part by weight of silica
- 95 parts by weight of water (demineralized)

The individual components are dispersed in a stirred vessel and ground in circulation using a closed stirred ball mill and zirconia grinding bodies until the final particle size of <1 μm has been attained.

Accordingly, the slurries shown in Table 1 below were produced.

TABLE 1

| | Water | Solids | TBLS+ content |
|---|---|---|---|
| TBLS+ slurry (comparison) | 57.7% | 42.3% | 33.8% |
| TBLS+/red lead slurry (invention) | 45.5% | 54.5% | 18.8% 35.3% red lead (>30% $PbO_2$) |

N.B.: TBLS+ means mixture of tetrabasic lead sulphate and finely divide silica (mixing ratio: 2000:1 to 200:1) according to EP 1 576 679 B1. TBLS+/red lead means a mixture deriving from the present invention (weight ratio of TBLS+: red lead 1:1.5).

It can be calculated from the figures in Table 1 that, in the case of the inventive formulation, the proportion of TBLS+ has been reduced from 33.8% to 18.8%, or a reduction in expensive TBLS+ by 45% is achieved. The two slurries (comparison and invention) were converted to a paste for truck batteries as follows:

The composition of the pastes obtained in each case is shown in Table 2 below:

TABLE 2

| | TBLS+ (kg) (comparison) | TBLS+/red lead (kg) (invention) |
|---|---|---|
| Battery oxide (ground) | 878 | 903 |
| Water | 108 | 108 |
| Fibres | 0.675 | 0.675 |
| Additives | 8 | 12 |
| $H_2SO_4$ (D 1.4 g/ml) | 93.9 | 93.8 |

The formulations (comparison/invention) shown in table 2 were processed to give pastes for truck batteries as follows:

For production of the pastes for truck batteries, the appropriate amount of lead oxide (ground oxide) was initially charged in the mixer and the mixer was started. After the polyacrylic fibres (fibre length 3-7 mm) have been metered in manually, the lead oxide/fibre mixture is converted to a paste with water. After complete addition of water, the paste is homogenized for a further 3 minutes. Then the mixing tool is stopped and the TBLS+ or TBLS+/red lead mixture is added to the paste. After a further mixing time of 2 minutes, the sulphuric acid (50%, density 1.4 g/ml) is metered into the lead oxide paste within a period of 13 minutes. In the course of this, paste temperatures of 63° C. are established. The mixer is operated for a further 20 minutes until the paste temperature is 45° C. and is suitable for pasting of the lead grids.

Finally, the two battery pastes were painted onto lead grids in a customary manner and subjected to ripening. The procedure for this was as follows:

The pasted grids are surface dried in a predrier and stored on pallets in a vertical arrangement (suspended), and these pallets are placed into a ripening chamber. The ripening is effected according to the following ripening program (chamber parameters):
- 1st stage: 80° C., 100% relative humidity, 4 h.
- 2nd stage: 55° C., 70-80% relative humidity, 14 h.
- 3rd stage: 55-85° C., 0% relative humidity, 10 h.

An electron microscope image was made of each of the two ripened battery pastes. The image for the ripened battery paste which derives solely from TBLS+ is shown in FIG. 1, while FIG. 2 shows an image of the ripened battery paste of the invention. No relevant differences are identifiable. The same applies to the image with an X-ray diffractometer. In this regard, reference is made to the following FIG. 3 (TBLS+/ripened battery paste) (comparison/Penox A) and to FIG. 4 (TBLS+/red lead/ripened battery paste) (Invention/Penox B). It is found that no peak which could be assigned to an originally present tribasic lead sulphate is evident in either diffractogram. The assignment of the individual peaks is shown by the identifier given below the diffractograms.

Subsequently the plates are installed in truck batteries of the B type having a nominal capacity of 168 Ah and a cold-start discharge performance CCA of at least 90 seconds (discharge of the battery at −18° C. and 633 ampères down to 6 volts). After the batteries have been filled with sulphuric acid of density 1.074 g/ml, the batteries are subsequently in the laboratory in accordance with the charge program as shown below.

Table 3 below shows a formation program for truck batteries in which firstly, as shown above, TBLS+ and, secondly, a TBLS+/red lead mixture is employed. A formation program by which the different batteries are charged is specified here:

TABLE 3

| Step | Time [h] | Current [A] | Capacity [Ah] | Peak temperature [° C.] |
|---|---|---|---|---|
| 1 | 13 | 24 | 312 | 73 |
| 2 | 1 | 0 | 0 | 66 |
| 3 | 14 | 10 | 140 | 64 |
| Total | 28 | | 452 | |

Using the formation program according to Table 3, the results shown in Table 4 below were obtained:

TABLE 4

| Results | | TBLS+ (comparison) | TBLS+/red lead (invention) |
|---|---|---|---|
| Pos. plate | $PbO_2$ % | 91.0 | 91.3 |
| | $PbSO_4$ % | 3.9 | 3.6 |
| Neg. plate | Pb % | 91.8 | 92.2 |
| | $PbSO_4$ % | 4.8 | 3.3 |
| | PbO % | 2.6 | 2.9 |

The figures in Table 4 show that the invention, in spite of a considerably lowered proportion of TBLS+, exhibits the same charging characteristics as the material according to the comparative experiment, and with the considerable advantage that a large proportion of inexpensive red lead exists in the additive.

The charged truck batteries, deriving firstly from the TBLS+ formulation (comparison) and secondly from the TBLS+/red lead formulation (invention), were subjected to a K20 test for capacity determination. The batteries were discharged at a constant 8.4 A. This gave the measurements shown in Table 5 below:

TABLE 5

| K20 test | TBLS+ (Ah) | TBLS+/red lead (Ah) | Specification value (Ah) |
|---|---|---|---|
| 1 | 178.3 | 184.1 | 168 |
| 2 | 177.6 | 185.4 | 168 |
| 3 | 176.8 | 181.2 | 168 |
| 4 | 174.3 | 182.5 | 168 |
| 5 | 174.4 | 180.8 | 168 |
| 6 | 172.1 | 178.1 | 168 |

The specification 168 Ah is the nominal capacity of the battery employed. The values achieved in accordance with the invention are evidently not just well above the specification values but also considerably above the values for the comparative experiment.

In addition, a cold-start current test (CCA) was undertaken, in which the batteries were discharged at −18° C. and 633 A down to a residual voltage of 6 volts. This gave the values shown in Table 6 below:

TABLE 6

| CCA | TBLS+ (s) | TBLS+/red lead (s) | Specification value (s) |
|---|---|---|---|
| after the first 20-hour discharge | 219 | 240 | 90 |
| after the second 20-hour discharge | 258 | 260 | 90 |
| after the third 20-hour discharge | 243 | 257 | 90 |

Both in the comparative test and in the test which derives from the present invention, a high high-current discharge resistance is observed. However, the invention is distinctly superior to the comparative example.

The invention claimed is:

1. An additive for production of positive active compositions for lead accumulators, the additive being based on finely divided tetrabasic lead sulphate having a mean particle size of less than about 3 µm and finely divided silica, wherein the additive comprises red lead (2PbO, $PbO_2$), and wherein the mean particle size of the red lead is less than about 1.5 µm and/or there are less than 2.2 mol of PbO per 1 mol of $PbO_2$ in the red lead.

2. An additive as claimed in claim 1, wherein the additive contains 20 to 80% by weight of red lead.

3. An additive as claimed in claim 2, wherein the additive contains 45 to 65% by weight of red lead.

4. An additive as claimed in claim 1, wherein the mean particle size of the red lead is between 0.4 and 0.6 µm.

5. An additive as claimed in claim 1, wherein the red lead has a specific BET surface area of less than 1.5 m²/g.

6. An additive as claimed in claim 1, wherein there are less than 2.1 mol of PbO per 1 mol of $PbO_2$.

7. An additive as claimed in claim 1, wherein the finely divided silica is hydrophobic and/or hydrophilic.

8. An additive as claimed in claim 1, wherein the finely divided silica has a mean particle size of 10 to 120 nm and/or a specific BET surface area of less than 300 m²/g.

9. An additive as claimed in claim 1, wherein the mean particle size of the tetrabasic lead sulphate is less than 1.5 µm.

10. An additive as claimed in claim 1, wherein the additive, based on the total weight of tetrabasic lead sulphate and finely divided silica, contains 0.01 to 10% by weight of finely divided silica.

11. An additive as claimed in claim 1, wherein it is in the form of an aqueous slurry, the slurry containing 30 to 65% by weight of additive.

12. An additive as claimed in claim 11, wherein the aqueous slurry contains 53 to 57% by weight of additive.

13. A process for producing an additive as claimed in claim 1 wherein tetrabasic lead sulphate and red lead are wet-ground in an aqueous medium, the grinding being continued until the mean particle size of the tetrabasic lead sulphate is less than 3 µm, and finely divided silica being added to the tetrabasic lead sulphate and red lead which is to be ground or has been ground.

14. A process as claimed in claim 13, wherein the wet grinding is performed in stirred ball mills.

15. A process as claimed in claim 14, wherein the wet grinding is performed with grinding bodies in the form of zirconia balls.

16. A process as claimed in claim 13, wherein the grinding product obtained in the form of an aqueous slurry is converted to a powder by drying.

17. A process as claimed in claim 13, wherein the wet grinding is performed at a temperature of less than 70° C.

18. A process as claimed in claim 17, wherein the wet grinding is performed at a temperature of 40 to 50° C.

* * * * *